United States Patent [19]

Sato et al.

[11] Patent Number: 5,212,207
[45] Date of Patent: May 18, 1993

[54] STYRENE-DIVINYLBENZENE COPOLYMER HAVING BOTH AMINO AND PHOSPHONATE GROUPS

[75] Inventors: Yoshio Sato, Toride; Katsuo Murayama, Urawa; Yoshihiro Nakai, Toride, all of Japan

[73] Assignee: Director-General of Agency of Industrial Science and Technology, Japan

[21] Appl. No.: 843,157

[22] Filed: Feb. 28, 1992

[30] Foreign Application Priority Data

Mar. 30, 1991 [JP] Japan .................................. 3-093361

[51] Int. Cl.$^5$ ............................................. C08F 8/40
[52] U.S. Cl. ............................... 521/32; 525/332.2; 525/340
[58] Field of Search ............. 521/32; 525/332.2

[56] References Cited
U.S. PATENT DOCUMENTS

| | | | |
|---|---|---|---|
| 4,271,276 | 6/1981 | MaKarova | 525/332.2 |
| 4,442,231 | 4/1984 | Kataoka et al. | 521/32 |
| 4,895,905 | 1/1990 | Schneider et al. | 521/32 |
| 5,109,074 | 4/1992 | Eiffler et al. | 525/326.7 |

*Primary Examiner*—Bernard Lipman
*Attorney, Agent, or Firm*—Lorusso & Loud

[57] ABSTRACT

A bifunctional styrene-divinylbenzene three-dimensional copolymer useful as an adsorbent of nitrate ion is disclosed. The copolymer contains phosphonate and amino groups of the following formulas:

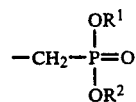

wherein $R^1$ and $R^2$ stand, independently from each other, for a hydrocarbyl group, and

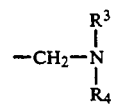

wherein $R^3$ and $R^4$ stand, independently from each other, for hydrogen or an alkyl group with the proviso that $R^3$ and $R^4$ do not represent hydrogen at the same time.

4 Claims, 2 Drawing Sheets

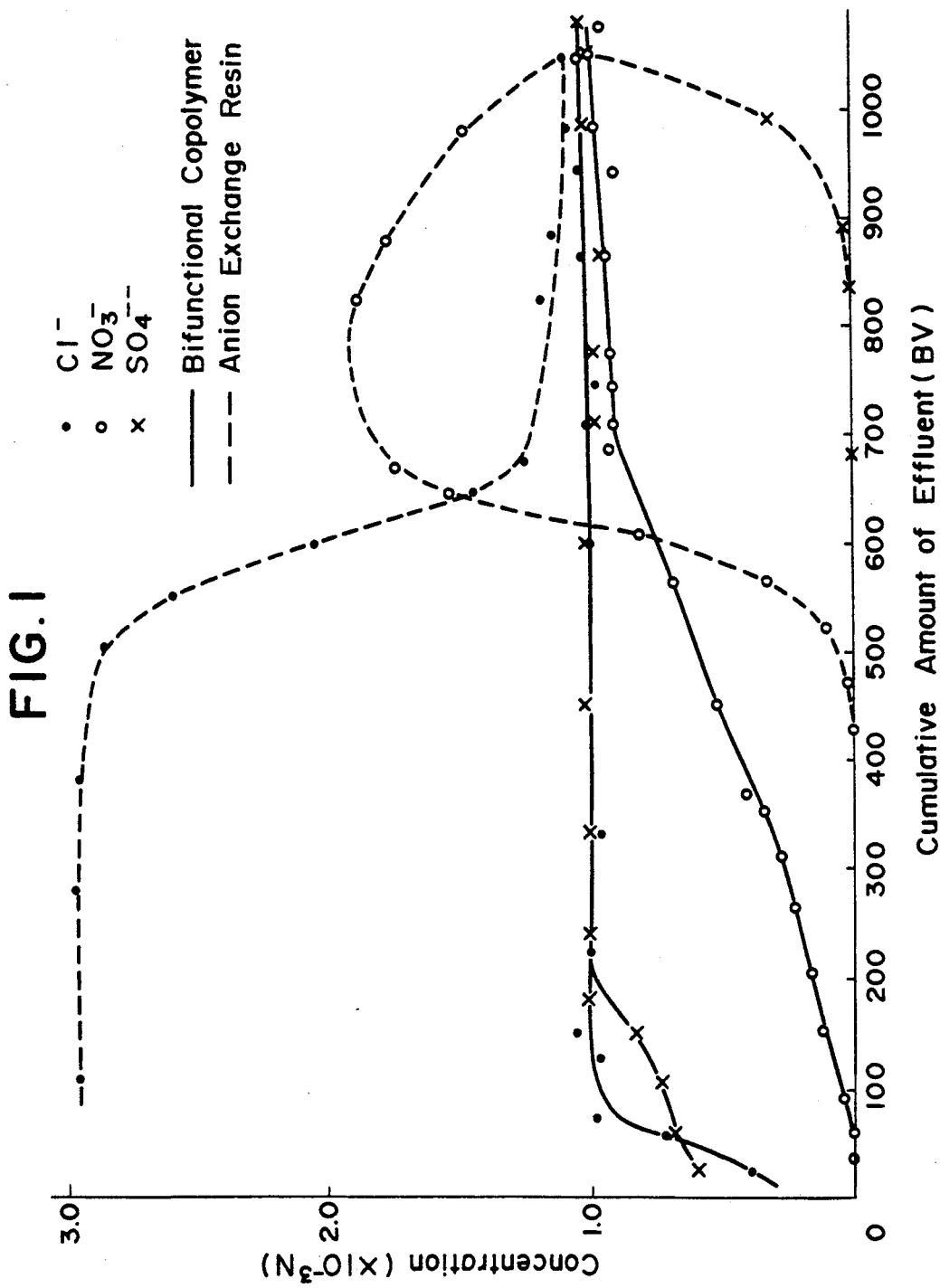

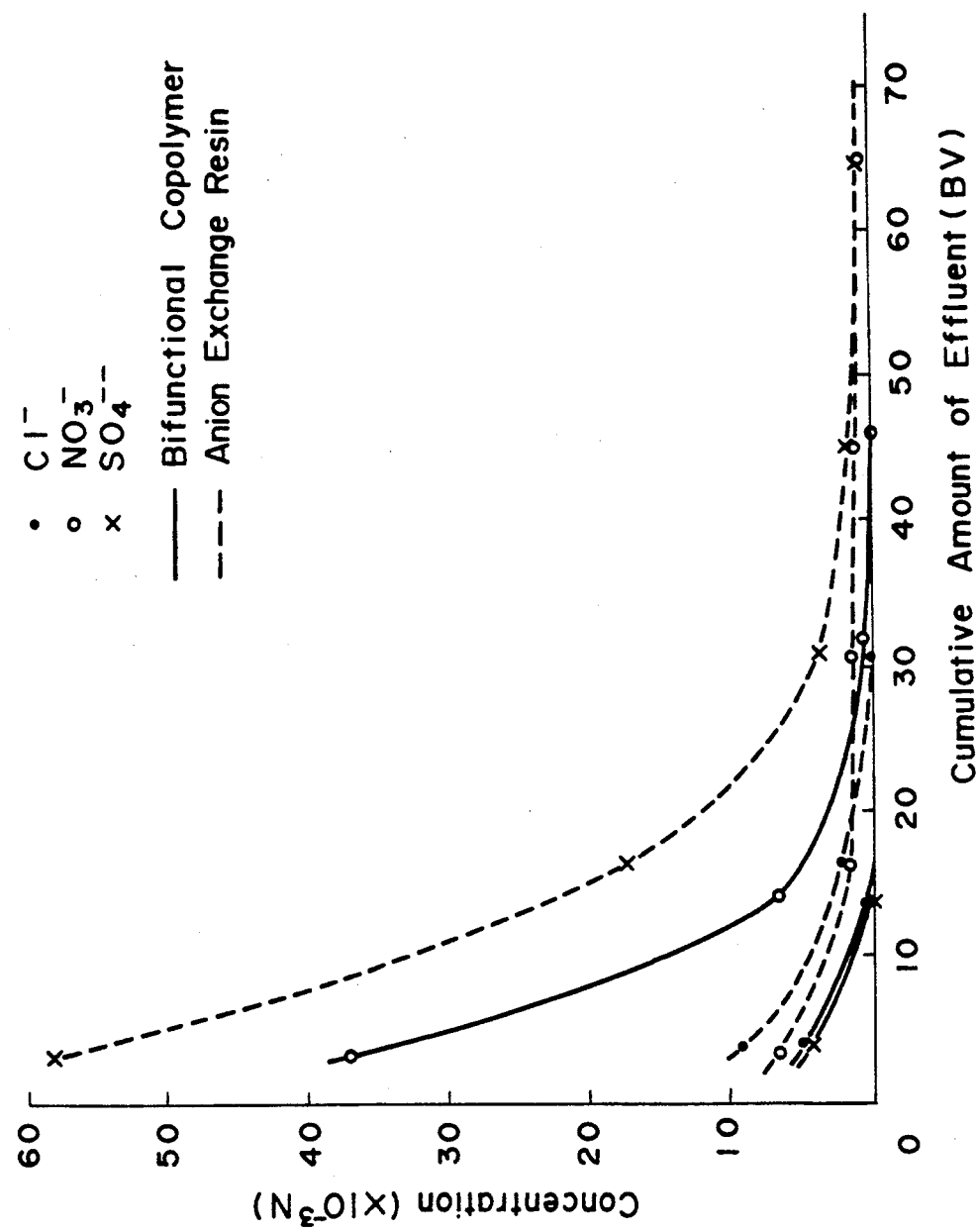

STYRENE-DIVINYLBENZENE COPOLYMER HAVING BOTH AMINO AND PHOSPHONATE GROUPS

BACKGROUND OF THE INVENTION

1. Field of the Invention

This invention relates generally to a novel polymer material and, more specifically, to a styrene-divinylbenzene three-dimensional copolymer having two different functional groups bonded directly to at least portion of the benzene nuclei of the copolymer and useful as a nitrate ion adsorbent.

2. Description of Prior Art

Known nitrate ion adsorbents include a graphite-nitric acid intercalated compound (Japanese Published Examined Patent Application No. Sho-60-18605) and an anion ion exchange resin having tributylamino groups (U.S. Pat. No. 4,479,877). The former adsorbent has a disadvantage because the absorption and desorption rates are not high. The latter, anion resin adsorbent has a drawback that it is difficult to regenerate the used adsorbent, although the selectivity thereof to nitrate ion is high.

SUMMARY OF THE INVENTION

It is, therefore, the prime object of the present invention to provide a novel polymer material useful for application to a nitrate ion adsorbent.

In accomplishing the above object, there is provided in accordance with the present invention a three-dimensional polymer having a skeletal structure of a styrene-divinylbenzene three-dimensional copolymer and containing (a) phosphonate-containing groups directly bonded to the benzene rings of the skeletal structure and having the following formula (I):

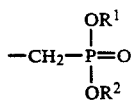

(I)

wherein $R^1$ and $R^2$ stand, independently from each other, for a hydrocarbyl group, and (b) amino-containing groups directly bonded to the benzene rings of the skeletal structure and having the following formula (II):

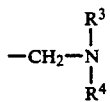

(II)

wherein $R^3$ and $R^4$ stand, independently from each other, for hydrogen or an alkyl group with the proviso that $R^3$ and $R^4$ do not represent hydrogen at the same time.

BRIEF DESCRIPTION OF THE DRAWINGS

Other objects, features and advantages of the present invention will become apparent from the detailed description of the preferred embodiments of the invention which follows, when considered in light of the accompanying drawings in which:

FIG. 1 is a graph showing nitrate ion-absorption capacity of the novel copolymer according to the present invention and of the conventional anion exchange resin; and FIG. 2 is a graph showing desorption characteristics of the above copolymer and the anion exchange resin.

DETAILED DESCRIPTION OF THE PREFERRED EMBODIMENTS OF THE INVENTION

The novel polymer according to the present invention is characterized in that both phosphonate-containing groups of the general formula (I) and amino-containing groups of the general formula (II) are bonded directly to the benzene rings of a styrene-divinylbenzene copolymer having a three-dimensional skeletal structure. The both groups (I) and (II) are generally bonded to different benzene rings.

The hydrocarbyl group represented by symbols $R^1$ and $R^2$ may be, for example, an alkyl group, a cycloalkyl group, an aryl group or an aralkyl group. Illustrative of suitable hydrocarbyl groups include a lower alkyl group such as methyl, ethyl, propyl, butyl, pentyl, hexyl or octyl; a higher alkyl such as with 9–20 carbon atoms; a cyclohexyl group or a substituted cyclohexyl group; a phenyl group or a substituted phenyl group; and a benzyl group.

The alkyl group represented by symbols $R^3$ and $R^4$ may be, for example, a lower alkyl group such as methyl, ethyl, propyl, butyl, pentyl, hexyl or octyl; or a higher alkyl such as with 9–20 carbon atoms.

The proportion of the phosphonate-containing groups and the amino-containing groups in the novel polymer is preferably such that the number of the phosphonate-containing groups to that of the amino-containing groups is in the range of 0.1–10, more preferably 0.8–1.2, and that the total number of the phosphonate-containing groups and the amino-containing groups is in the range of 0.1–1, more preferably 0.5–1, per one benzene ring of the skeletal structure.

The styrene-divinylbenzene three-dimensional copolymer which forms a skeletal structure of the novel polymer may optionally contain other substituted styrene monomer units such as alkyl styrenes, e.g. methyl styrene.

The molar ratio of the divinylbenzene to the styrene in the skeletal structure is preferably in the range of 0.005–1, more preferably 0.02–0.1.

The novel polymer according to the present invention may be prepared by a method in which a styrene-divinylbenzene copolymer is reacted to be introduced with phosphonate-containing and amino-containing groups. In this method, any commercially available styrene-divinylbenzene copolymer may be used as a starting material. Introduction of the functional groups may be effected by reacting the starting material copolymer with a halomethane such as chloromethane to introduce halomethyl groups into the copolymer, followed by phosphorylation and amination of the halomethyl groups. Such halomethylation may be additionally performed between the phosphorylation and amination, if desired.

The preparation of the novel polymer may also be carried out by a method in which halomethylstyrene is copolymerized with divinylbenzene to form a styrene-divinylbenzene three dimensional copolymer having halomethyl groups, the resulting copolymer being subsequently phosphorylated and aminated. In this case, styrene may be substituted for a part of the halomethylstyrene to be copolymerized with divinylbenzene, if desired.

The phosphorylation, i. e. reaction of the halomethyl group with a phosphite such as a trialkylphosphite, may be carried out at a temperature of 100°–200 °C. for 10–30 hours. A solvent such as diethylbenzene or triisopropylbenzene may be used, if desired. The amination, i. e. reaction of the halomethyl group with a primary or secondary amine such as decylamine, may be carried out at room temperature for about 12 hours. The halomethylation may be effected by reacting a halomethyl ether such as chloromethyl methyl ether with a phenyl group in the presence of a catalyst such as stannic chloride.

Alternatively, copolymerization of divinylbenzene with a mixture containing phosphorylated styrene, aminated styrene and, optionally, non-substituted styrene may also give the polymer according to the present invention.

The novel polymer according to the present invention may be in the form of powder, beads, a fiber, a film or any other desired shape. Such forms of the polymer may be produced by any known method. In addition, the polymer can be composited with another material such as polyvinyl chloride.

The bifunctional, three-dimensional copolymer of the present invention can selectively adsorb nitrate ion contained in an acidic or slightly acidic solution. The copolymer can release the adsorbed nitrate ion when contacted with an alkaline liquid. Further, the copolymer exhibits high resistance to acid, organic solvents and water. Thus, the copolymer may be advantageously utilized as a nitrate ion-adsorbent.

The following examples will further illustrate the present invention.

EXAMPLE

A styrene-divinylbenzene copolymer (BIOBEADS S-X4, divinylbenzene content: 4 %) in the form of spherical particles was reacted with chloromethyl methyl ether in the presence of stannic chloride to obtain a chloromethylated copolymer. The chloromethylated copolymer (CMP, 20 g) was then mixed with tributylphosphite (100 ml) and diethylbenzene (100 ml) and the mixture was reacted at 140 °C. for a half day. The reaction mixture was then filtered and the solids were washed with benzene and further washed, using a Soxhlet extractor, with benzene and methanol to obtain a phosphorylated copolymer having a content of the dibutylphosphonate group of 4 mmol P/g CMP. This copolymer was reacted with chloromethyl methyl ether in the presence of stannic chloride to incorporate chloromethyl groups into the copolymer. After being washed with water, the resulting copolymer was reacted with decylamine at room temperature for a half day to obtain a bifunctional styrene-divinylbenzene copolymer having phosphonate groups of the formula —$CH_2P(O)(OC_4H_9)_2$ and decylamino groups of the formula —$CH_2NHC_{10}H_{21}$ and a molar ratio of the phosphonate group to the decylamino group of 1:1.2.

The bifunctional copolymer was tested for its performance as an adsorbent. Thus the copolymer adsorbent (4 ml) was packed in a glass column held in a vertical position. The length of the adsorbent layer was about 1.5 cm. A $CO_2$ saturated aqueous solution containing $1\times10^{-3}N$ of sodium nitrate, $1\times10^{-3}N$ of sodium chloride and $1\times10^{-3}N$ of sodium sulfate was continuously fed to the top of the column and allowed to flow through the packed adsorbent layer. The effluent was measured for the concentrations of respective anions. The results are shown in FIG. 1. In FIG. 1, the abscissa represents the bed volume (BV; cumulative amount of the effluent in terms of a volume ratio of the effluent to the adsorbent), while the ordinate represents the concentration ($\times 10^{-3}N$) of respective anions in respective effluent fractions.

For the purpose of comparison, similar test was performed using a commercially available anion exchange resin (Dowex IIx8). The results are also shown in FIG. 1.

Thereafter, an aqueous solution containing 0.1M of sodium hydroxide was fed to the column for the regeneration of the adsorbent. The results are shown in FIG. 2. In FIG. 2, the abscissa and ordinate are the same as those in FIG. 1. The proportion of the eluted anions was calculated on the basis of the results shown in FIG. 2 to give the results summarized in Table 1 below.

TABLE 1

Proportion of Respective Adsorbed Ions Based on Total Amount of Adsorbed Ions (equivalent)

| Adsorbent | Amount of Ion Adsorbed (%) | | |
|---|---|---|---|
| | $Cl^-$ | $NO_3^-$ | $SO_4^{--}$ |
| Inventive Bifunctional Copolymer | 8.8 | 83.0 | 8.2 |
| Conventional Anion Exchange Resin | 9.4 | 13.1 | 77.6 |

From the results shown in FIG. 1, it is appreciated that the concentrations of nitrate ion at BV of 250 and 450 are $0.2\times10^{-3}N$ and $0.5\times10^{-3}N$, respectively, showing that the removal rates of nitrate ion are 80 % and 50 %, respectively. In the case of conventional anion exchange resin, chloride ion is first discharged in an amount corresponding to the total anion concentration of the aqueous solution to be treated. The chlorine ion concentration decreases as nitrate ion begins eluting. The maximum nitrate ion concentration is about 1.8 times that of the aqueous solution to be treated. The elution of sulfate ion commences at BV of 850.

From the results shown in FIG. 2, it is seen that the bifunctional copolymer of this invention can be regenerated upon contact with 40 times volume of the alkaline solution. The regeneration of the conventional resin requires much more amount of the alkaline solution.

The results shown in Table 1 above show that the bifunctional copolymer of this invention can preferentially adsorb nitrate ion while the conventional resin shows selectivity to sulfate ion.

Thus, the bifunctional copolymer according to the present invention can selectively adsorb nitrate ion and, therefore, can selectively remove nitrate ion from a raw liquid containing various anions. By passing such a raw liquid through a packed layer of the bifunctional copolymer, it is possible to continuously obtain a treated liquid having an extremely reduced concentration of nitrate ion with the concentrations of the remainder anions being substantially unchanged. While the adsorption capacity of the copolymer is gradually exhausted with an increase in process time, it is possible to regenerate the exhausted copolymer by contact with an alkaline solution.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A three-dimensional polymer having a skeletal structure of a styrene-divinylbenzene three-dimensional copolymer and containing (a) phosphonate-containing groups directly bonded to the benzene rings of said skeletal structure and having the following formula:

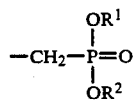

wherein $R^1$ and $R^2$ stand, independently from each other, for a hydrocarbyl group and (b) amino-containing groups directly bonded to the benzene rings of said skeletal structure and having the following formula:

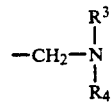

wherein $R^3$ and $R^4$ stand, independently from each other, for hydrogen or an alkyl group with the proviso that $R^3$ and $R^4$ do not represent hydrogen at the same time.

2. A polymer as claimed in claim 1, wherein the ratio of the number of said phosphonate-containing groups to that of said amino-containing groups is in the range of 0.1-10.

3. A polymer as claimed in claim 1, wherein the total number of said phosphonate-containing groups and said amino-containing groups is in the range of 0.1-1 per one benzene ring of said skeletal structure.

4. A polymer as claimed in claim 1, wherein said hydrocarbyl group is selected from the group consisting of alkyl groups, cycloalkyl groups, aryl groups and aralkyl groups.

* * * * *

UNITED STATES PATENT AND TRADEMARK OFFICE
CERTIFICATE OF CORRECTION

PATENT NO. : 5,212,207
DATED : May 18, 1993
INVENTOR(S) : SATO et al

It is certified that error appears in the above-identified patent and that said Letters Patent is hereby corrected as shown below:

On the title page, Item

[75] Inventors, line 2, "Yoshihiro" should read --Toshihiro--.

Signed and Sealed this

Eighteenth Day of January, 1994

Attest:

BRUCE LEHMAN

*Attesting Officer*  *Commissioner of Patents and Trademarks*